(12) United States Patent
Rotschield et al.

(10) Patent No.: US 10,719,200 B2
(45) Date of Patent: Jul. 21, 2020

(54) ARCHITECTURE FOR REMOTE CONTROL OF IOT (INTERNET OF THINGS) DEVICES

(71) Applicant: Sure Universal Ltd., Ramat Gan (IL)

(72) Inventors: Ofer Rotschield, Kiriat Ono (IL); Max Kholmyansky, Ramat Gan (IL); Viktor Ariel, Modiin (IL); Vadim Lanzman, Petach Tikva (IL)

(73) Assignee: Sure Universal Ltd., Ramat Gan (IL)

( * ) Notice: Subject to any disclaimer, the term of this patent is extended or adjusted under 35 U.S.C. 154(b) by 341 days.

(21) Appl. No.: 15/436,816

(22) Filed: Feb. 19, 2017

(65) Prior Publication Data

US 2017/0242557 A1 Aug. 24, 2017

Related U.S. Application Data

(60) Provisional application No. 62/296,627, filed on Feb. 18, 2016.

(51) Int. Cl.
*G06F 3/0482* (2013.01)
*G06F 3/0484* (2013.01)
(Continued)

(52) U.S. Cl.
CPC .......... *G06F 3/0482* (2013.01); *G06F 3/0484* (2013.01); *G06F 3/04817* (2013.01);
(Continued)

(58) Field of Classification Search
CPC ................................. G06F 3/167; G06F 21/62
See application file for complete search history.

(56) References Cited

U.S. PATENT DOCUMENTS

2003/0034897 A1* 2/2003 Shamoon ............... G08C 17/02
340/12.22
2005/0246624 A1* 11/2005 Humpleman ....... H04L 12/2803
715/201

(Continued)

OTHER PUBLICATIONS

Barnett, J. et al. "State Chart XML (SCXML): State Machine Notation for Control Abstraction", W3C Recommendation Sep. 1, 2015 (Retrieved on May 22, 2017). Retrieved from the Internet: <https://www.w3.org/TR/scxml/>.

(Continued)

*Primary Examiner* — Rayeez R Chowdhury
(74) *Attorney, Agent, or Firm* — Heidi Brun Associates Ltd.

(57) ABSTRACT

A method includes implementing a single GUI for all the appliances which includes a set of input panels, an appliance selector panel and an output panel, communicating with the appliances with a multiplicity of agents, each implementing one appliance protocol of communication and converting between an internal format and the appliance protocol of communication; controlling activity of the agents, receiving a user command to a selected appliance issued from one of the input panels and generating at least one associated internal command in response to the user commands, providing the at least one associated internal command to the controlling for instruction to one of the agents associated with the selected appliance, storing information about each appliance to be controlled by the remote controller, and receiving notifications from the agents about the state of at least one of the appliances and providing the notifications to be displayed on the GUI.

10 Claims, 11 Drawing Sheets

(51) Int. Cl.
  *H04L 12/24* (2006.01)
  *G06F 3/0481* (2013.01)
  *H04L 12/28* (2006.01)
  *H04W 84/12* (2009.01)
(52) U.S. Cl.
  CPC ........ H04L 12/2816 (2013.01); H04L 41/022 (2013.01); H04L 41/0226 (2013.01); H04L 41/046 (2013.01); H04L 41/22 (2013.01); H04W 84/12 (2013.01)

(56) References Cited

U.S. PATENT DOCUMENTS

| | | |
|---|---|---|
| 2007/0279389 A1 | 12/2007 | Hoch et al. |
| 2008/0288618 A1 | 11/2008 | Vardi et al. |
| 2009/0058708 A1 | 3/2009 | Park et al. |
| 2011/0047474 A1* | 2/2011 | Sung ................ H04M 1/72533 715/740 |
| 2014/0067094 A1* | 3/2014 | Park ...................... G05B 15/02 700/90 |
| 2014/0201340 A1 | 7/2014 | Barnhill et al. |
| 2014/0229889 A1* | 8/2014 | Hilbrink ............... G06F 3/0484 715/784 |
| 2015/0365480 A1 | 12/2015 | Soto et al. |
| 2016/0018832 A1* | 1/2016 | Frank .................... H04W 4/021 700/276 |
| 2016/0094702 A1* | 3/2016 | Ariel ...................... A63F 13/86 455/420 |

OTHER PUBLICATIONS

International Search Report for application PCT/IB2017/050937 dated May 28, 2017.

\* cited by examiner

ARCHITECTURE FOR REMOTE CONTROL OF IOT (INTERNET OF THINGS) DEVICES

CROSS REFERENCE TO RELATED APPLICATIONS

This application claims priority from U.S. provisional patent application 62/296,627, filed Feb. 18, 2016 which is incorporated herein by reference.

FIELD OF THE INVENTION

The present invention relates to smart appliances generally and to remote control of smart appliances in particular.

BACKGROUND OF THE INVENTION

Remote control devices are known and have been used for many years to control one appliance. In recent years, universal remote controllers have been developed which attempt to control multiple appliances with a single device. U.S. patent application Ser. No. 14/870,353, filed Sep. 30, 2015, now issued as U.S. Pat. No. 9,842,491, issued Dec. 12, 2017, assigned to the common assignee of the present application and incorporated herein by reference, describes a universal remote controller implemented as an application (or "app") on a hand-held smart device, like a mobile phone, tablet, etc. The app has a unified interface for WiFi and IR remote-controlled appliances.

Reference is now made to FIG. 1, which generally illustrates the operation of such a universal remote controller 100 and to FIG. 2, which details the elements of the user interface of universal remote controller 100. Each end user 102 has the application downloaded on his/her own mobile device and uses it to control the appliances 110 in his/her space, such as a home, an office, etc. Appliances 110 may be WiFi appliances 110a, such as digital media, TV, etc., or infrared (IR) controlled devices 110b, such as set top boxes and air conditioning units.

In addition, each remote controller 100 communicates with an Internet-based server 110, which provides information to the multiple remote controllers 100.

As shown in FIG. 2, universal remote controller 100 may have multiple sections to its user interface. One section 102, on the top of the user interface, shows breadcrumbs of the multiple types of appliances available to be controlled and enables the user to add a new appliance to his/her personal list of appliances. A second section 104, on the side of the user interface, is a device selector and enables the user to change the appliance currently being controlled (chosen from among those associated with this mobile device).

A third section 106, in the lower middle of the display, is a device input panel with multiple control buttons. The input panel shown in FIG. 2 has the cursor, volume and play related buttons on it. The various types of control buttons are organized into a plurality of panels organized by topic, such as volume, channel, alphabetic, buttons needed for watching a show, a device input panel selector and are changeable using the device input panel selector 108 at the bottom of the display.

Finally, the user interface has a device output panel 109, used to provide any output from the device, if such is available.

To add a new appliance to its database of controlled appliances, a designer has to register each instruction of the appliance and associate it with a control instruction on one of the input panels of the universal remote controller. In addition, the universal remote controller has a separate state machine for each appliance, which the designer needs to build for any new appliance.

SUMMARY OF THE PRESENT INVENTION

There is therefore provided, in accordance with a preferred embodiment of the present invention, a system for universal remote controllers on a plurality of remote devices. Each remote controller controls appliances from multiple vendors and includes a single GUI on each remote device for all appliances, an appliance controller server, an appliance logic server and a client manager. The appliance controller server communicates with the appliances, each according to its protocol of communication, and converts between an internal communication format of the system and each the appliance protocol of communication. The appliance logic server implements a state machine per each appliance being controlled. The client manager server communicates with and manages the remote devices and communicates their per-appliance instructions to the appliance logic server, wherein at least two the remote devices instruct a single one of the appliances. The appliance logic server communicates the per-appliance instructions to the appliance controller server and updates the per appliance state machines based on the per-appliance instructions. The appliance controller server transmits the per-appliance instructions to the indicated appliance and the servers communicate via messages between the servers.

Moreover, in accordance with a preferred embodiment of the present invention, the GUI includes at least a set of predefined input panels, an appliance selector panel and an output panel and the client manager updates the GUI on each the remote device as the appliance logic server changes states of the appliances.

Further, in accordance with a preferred embodiment of the present invention, the client manager receives a user command to a selected appliance issued from one of the input panels and generates at least one associated command in the internal format in response to the user commands.

There is also provided, in accordance with a preferred embodiment of the present invention, a universal remote controller implemented on a mobile device, the remote controller controlling appliances from multiple vendors. The remote controller includes a GUI interface adapter to implement a single GUI for all the appliances, the GUI including at least a set of input panels, an appliance selector panel and an output panel, a multiplicity of agents, an agent manager, a command manager, an appliance manager and a notification manager. The multiplicity of agents commands the appliances. Each agent implements one appliance protocol of communication and converts between an internal communication format of the system and the appliance protocol of communication implemented therein. The agent manager controls the activity of the multiplicity of agents. The GUI interface adapter receives a user command to a selected appliance issued from one of the input panels and generates at least one associated internal command in response to the user commands. The command manager provides the at least one associated internal command to the agent manager for instruction to one of the agents associated with the selected appliance. The appliance manager stores information about each appliance to be controlled by the remote controller. The notification manager receives notifications from the agents about the state of at least one of the appliances and provides the notifications to the appliance manager and to the GUI interface adapter to be displayed on the GUI. The managers, agents and adapter communicate via messages on an event bus.

Moreover, in accordance with a preferred embodiment of the present invention, the remote controller also includes a discovery manager to activate at least one agent to discover appliances within a vicinity of the mobile device and to provide the discovered appliances to the appliance manager to be added to the list of appliances being controlled by the controller.

Further, in accordance with a preferred embodiment of the present invention, the discovery manager also determines the attributes of the discovered appliances and provides an attribute list to the GUI interface adapter. The adapter includes an input element database associating attribute types with input display element types and generates new GUI input panels for the discovered appliances from the input display element types in the input element database.

Still further, in accordance with a preferred embodiment of the present invention, each agent broadcasts a request for discovery according to its associated appliance protocol of communication and receives responses from any appliance having its associated appliance protocol of communication and being connected on a network associated with the mobile device.

Additionally, in accordance with a preferred embodiment of the present invention, each agent fetches the attribute list of the appliance from an appliance resource database associated with the appliance.

Moreover, in accordance with a preferred embodiment of the present invention, the controller also includes a state manager to maintain and update a current state for each currently active appliance as reported by the notification manager.

There is also provided, in accordance with a preferred embodiment of the present invention, a system for universal remote controllers on mobile devices, the remote controllers controlling appliances from multiple vendors. The system includes a single GUI for all appliances, the GUI on each mobile device, at least one unit to communicate with the appliances according to their protocol of communication and to convert between an internal communication format and the appliance protocol of communication; and at least one unit to manage and monitor the appliances. The units communicate via messages between the units.

Moreover, in accordance with a preferred embodiment of the present invention, the at least one unit to communicate with the appliances is an appliance controller server and the at least one unit to manage and monitor the appliances is an appliance logic server and a client manager server.

Alternatively, in accordance with a preferred embodiment of the present invention, the at least one unit to communicate with the appliances is an agent per appliance protocol and the at least one unit to manage and monitor the appliances is at least an agent manager, a command manager, an appliance manager and a notification manager, all implemented on each the mobile device.

Further, in accordance with a preferred embodiment of the present invention, the system also includes a discovery manager to discover appliances within a vicinity of each the mobile device.

There is also provided, in accordance with a preferred embodiment of the present invention, a method for universal remote controllers on a plurality of remote devices. The method includes implementing a single GUI for all the appliances, the GUI on each the remote device, communicating with the appliances each according to its protocol of communication, converting between an internal communication format and each the appliance protocol of communication, executing a state machine per each appliance being controlled, managing the remote devices with per-appliance instructions from at least two of the remote devices to a single one of the appliances, updating the per appliance state machines based on the per-appliance instructions and transmitting the per-appliance instructions to the indicated appliance.

Moreover, in accordance with a preferred embodiment of the present invention, the GUI includes at least a set of predefined input panels, an appliance selector panel and an output panel and the managing includes updating the GUI on each the remote device as updating changes states of the appliances.

Further, in accordance with a preferred embodiment of the present invention, the method also includes receiving a user command to a selected appliance issued from one of the input panels and generating at least one associated command in the internal format in response to the user commands.

There is also provided, in accordance with a preferred embodiment of the present invention, a method for a universal remote controller implemented on a mobile device. The method includes implementing a single GUI for all the appliances, the GUI including at least a set of input panels, an appliance selector panel and an output panel, communicating with the appliances with a multiplicity of agents, each agent implementing one appliance protocol of communication and converting between an internal communication format and the appliance protocol of communication implemented therein; controlling the activity of the multiplicity of agents, receiving a user command to a selected appliance issued from one of the input panels and generating at least one associated internal command in response to the user commands, providing the at least one associated internal command to the controlling for instruction to one of the agents associated with the selected appliance, storing information about each appliance to be controlled by the remote controller, and receiving notifications from the agents about the state of at least one of the appliances and providing the notifications to be displayed on the GUI.

Moreover, in accordance with a preferred embodiment of the present invention, the method also includes activating at least one agent to discover appliances within a vicinity of the mobile device and adding the discovered appliances to the list of appliances being controlled by the controller.

Further, in accordance with a preferred embodiment of the present invention, the method also includes determining the attributes of the discovered appliances and generating new GUI input panels for the discovered appliances from the input display element types in an input element database associating attribute types with input display element types.

Still further, in accordance with a preferred embodiment of the present invention, the method also includes each agent broadcasting a request for discovery according to its associated appliance protocol of communication and receiving responses from any appliance having its associated appliance protocol of communication and being connected on a network associated with the mobile device.

Moreover, in accordance with a preferred embodiment of the present invention, the method also includes fetching the attribute list of the appliance from an appliance resource database associated with the appliance.

Finally, in accordance with a preferred embodiment of the present invention, the method also includes maintaining and updating a current state for each currently active appliance as reported by the receiving notifications.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
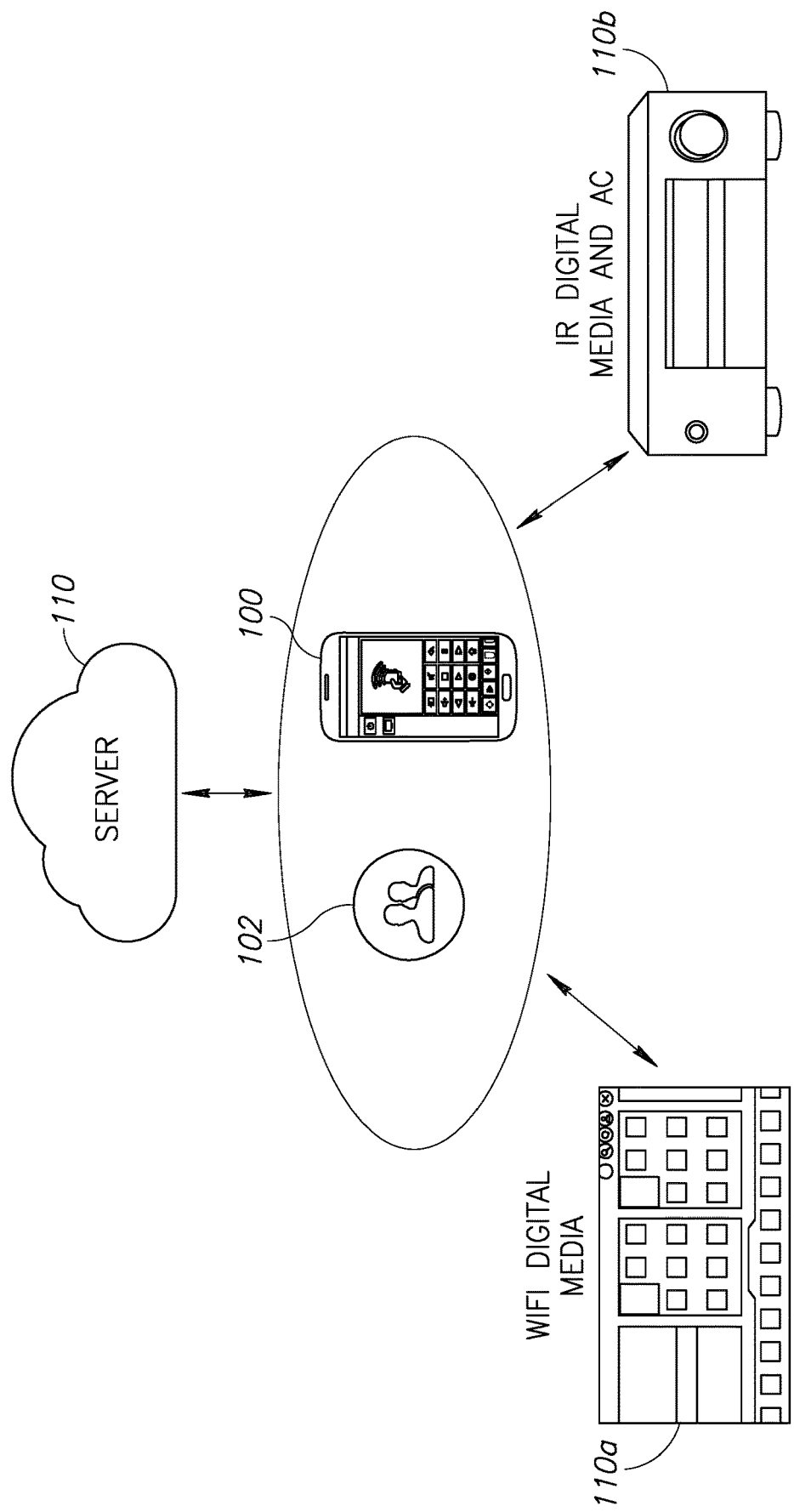
FIG. 1 is a schematic illustration of a prior art universal remote controller implemented on a mobile device.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that the world of remote controlled appliances is expanding and that smart appliances exist. The smart home concept involves being able to digitally control all of the appliances in the home and is not a new concept. However, recently it has received further impetus from the connection of many new devices to the Internet. The latter is now called the "Internet of Things" (IoT) and there are now many IoT devices.

There are several competing standardization efforts (OCF (Open Connectivity Foundation), AllJoyn, IGRS, etc.) and many vendors keep releasing products supporting only their proprietary protocols with their own SDKs (software developer kits). For example, Wulian, Haier, Samsung and Connect all have their own proprietary protocols.

Applicant has realized that, in order to add each new appliance to the universal remote controller of the prior art, the designers have to design the appropriate state machine for the new appliance and to indicate which of the input control devices of the universal interface are active for the new appliance.

Applicant has realized that the problems of the prior art are solved by separating the single user interface from the communication with the appliances. In accordance with a preferred embodiment of the present invention, each type of protocol has its own agent who may convert between the protocol (proprietary or a standard) and an internal messaging format. This may provide a single graphic user interface (GUI) for all devices with individualized communication for all devices.

Applicant has realized that, when each agent implements a specific protocol, if the protocol includes requesting the capabilities of the appliance, then the agent is capable of discovering all devices in its vicinity performing that protocol, where the vicinity of the device is defined by the specific protocol and network broadcast domain. That is, an agent may discover devices responding to a specific protocol which are on the same network domain as the device of the remote controller, such as a WiFi network, a home network or an infrared (IR) connection, to be able to receive the discovery request and understand and respond to it. This is opposed to the prior art which implemented only the specific capabilities of the appliance.

Moreover, separating out the various operations of the remote controller may enable multiple users to control the same appliance and may enable scalability of the system.

Figure 3:
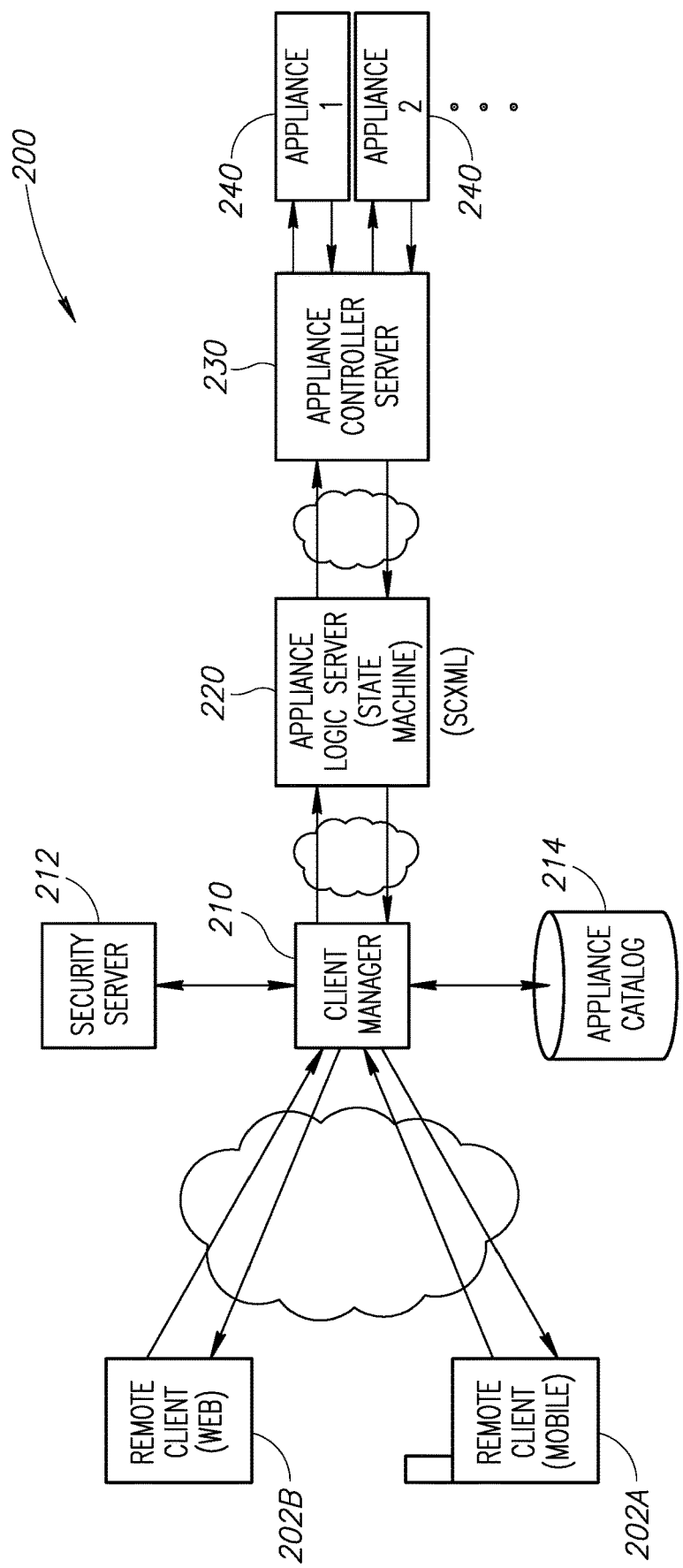
FIG. 3 is a block diagram illustration of a remote controller system which separates the GUI from the appliance handling, constructed and operative in accordance with a preferred embodiment of the present invention.

Reference is now made to FIG. 3, which illustrates a first embodiment of the remote controller system 200 for IoT (Internet of Things) appliances, constructed and operative in accordance with a preferred embodiment of the present invention. The system comprises a plurality of remote clients 202, a client manager 210, an appliance logic server 220 and an appliance controller server 230 controlling a plurality of appliances 240. In accordance with a preferred embodiment of the present invention, system 200 may be partitioned and implemented such that each component may run on a different cloud service, to allow portability and scalability.

Remote clients 202 may be any suitable remote client for a universal remote controller, operatable by a user, and may run on any suitable computing platform. For example, it may be run on an Android application, an iOS application, a web client, an application for a personal computer or a third party appliance. FIG. 3 illustrates both a web client 202B and a mobile application 202A. Remote clients 202 may provide a single, universal user interface, similar to that discussed in U.S. patent application Ser. No. 14/870,353, filed Sep. 30, 2015, now issued as U.S. Pat. No. 9,842,491, issued Dec. 12, 2017, and assigned to the common assignee of the present application, or they may provide any other suitable universal user interface, such as that shown in FIG. 4, to which reference is now briefly made.

Figure 4:
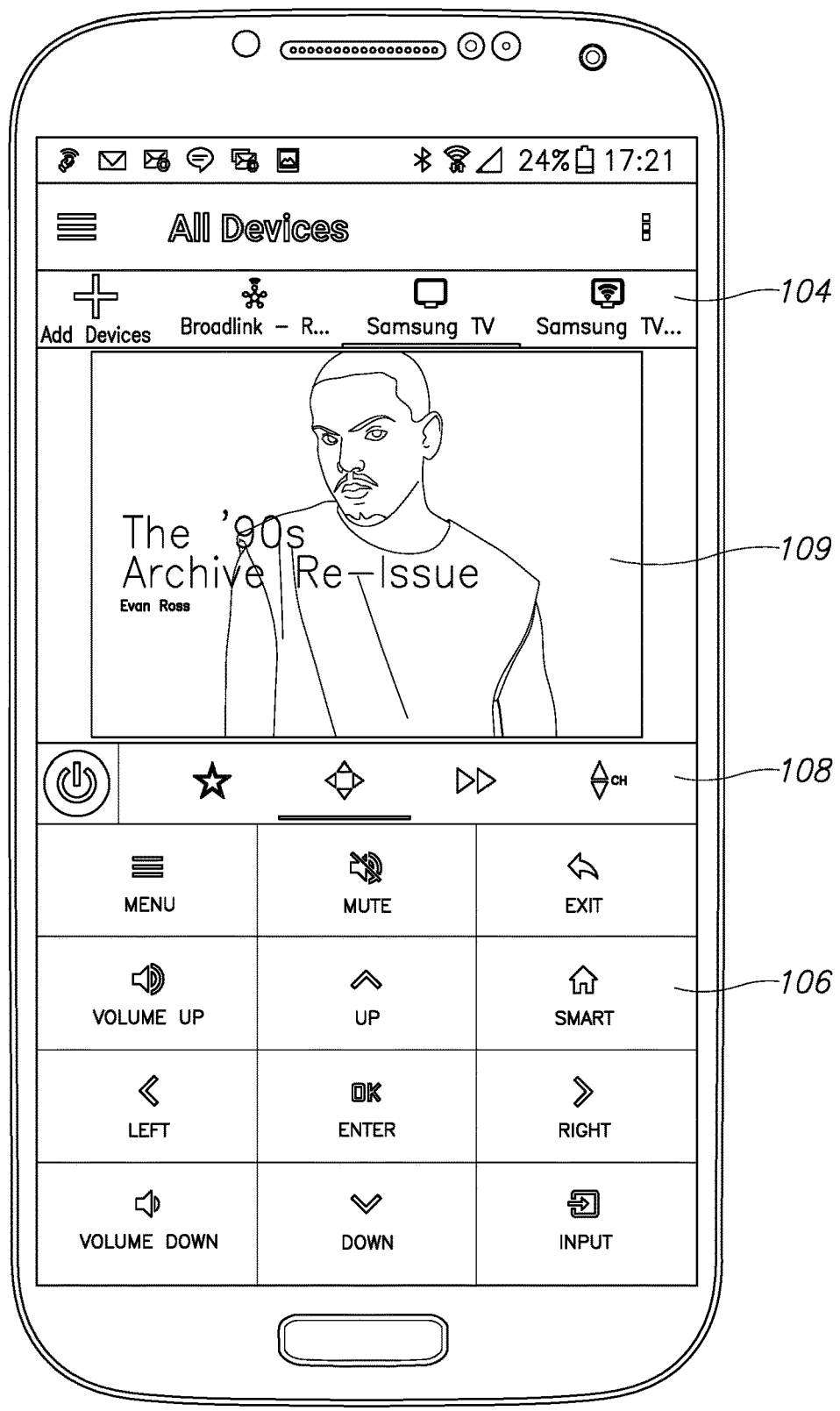
FIG. 4 is a schematic illustration of an alternative user interface, useful in the remote controller of FIG. 3.

The universal user interface of FIG. 4 is shown on a mobile device, though it may be implemented on any other suitable device. In this embodiment, device selector 104 may be placed above output panel 109 and may include breadcrumbs as well, while input panel selector 108 may be placed above the currently selected input panel 106.

Client manager 210 may register the multiple clients with their associated users into system 200 and may be the only unit to communicate with them. Each time client manager 210 may receive a command from one of clients 202, client manager 210 may perform an authentication and permission check to determine which appliances the user on the particular client 202 may control and what operations it may perform. For this operation, client manager 210 may utilize a security server 212. For example, children may only be allowed to turn appliances on or off while parents may be allowed to change the configuration of the appliances. Client manager 210 and/or security server 212 may implement this by defining multiple types of users (such as "parent", "young child", "teen child", etc.) with various levels of permissions for a multiplicity of operations and associating each user to its user type and each user to its client 202. It will be appreciated that security server 212 may enforce security per client and per request.

Once the particular client 202 may pass the security check, if the client 202 requests to register a new appliance, client manager 210 may access information about the new appliance from an appliance catalog 214 and may generate, based on the stored information, the appropriate user interface (i.e. the selected command elements defined in a set of input panels) to be displayed on client 202.

If a user then activates an input element, such as a button, a slider, a switch, etc., on the user interface of her client 202, her client 202 may connect to client manager 210 and may send a command to client manager 210. For example, client 202 may transmit the command "Turn AC ON". Client manager 210 may verify that the command is legal for the user and, if so, may transmit the command to appliance logic server 220.

In accordance with a preferred embodiment of the present invention, any appliance 240 may be defined by a state machine, which may define its multiple allowed states and the actions or events which may move appliance 240 from one state to another. The appliance may be in only one state at a time; the state it is in at any given time is called the current state. It can change from one state to another when initiated by a triggering event or condition; this is called a transition. A particular state machine is defined by a list of its states, and the triggering condition for each transition.

In accordance with a preferred embodiment of the present invention, appliance state machines may be described in SCXML, a language designed for defining state machines. SCXML may be defined by the "State Machine Notation for Control Abstraction", approved by The World Wide Web Consortium (W3C) in September 2015. SCXML may provide a generic state-machine based execution environment.

Thus, by defining a state machine for an appliance, its operation may be fully defined. Moreover, the response of the appliance to each of its input devices may be fully defined by the state machine. It will be appreciated that the state machine model of the appliance may, therefore, provide a language or a format for appliance manufacturers to define their appliances such that remote controllers of all types may communicate with them. Any new appliance may be easily added to system 200, just by downloading its SCXML to appliance logic server 220.

The SCXML may also be downloaded to each client 202 so that its user interface may more accurately reflect what is happening on the relevant appliance. In this embodiment, only relevant commands and state changes are displayed to the user.

Appliance logic server 220 may operate each appliance according to its previously stored state machine and may operate one state machine per appliance per user. Appliance logic server 220 may utilize each received command to change the state of the state machine. To do so, appliance logic server 220 may check that the command is valid considering the appliance's current state. If it is, server 220 may send a message with the command for execution to appliance controller server 230. Appliance logic server 220 may move the appliance's state machine to a new state based on the command, once server 220 receives a message from controller server 230 that the appliance 240 has been provided the command and/or that the appliance 240 has successfully implemented the command. Appliance logic server 220 may also update client manager 210 about the changed state, to be updated on the GUI of the relevant remote clients 202.

Appliance controller server 230 may handle all communication with appliances 240. It may have a plurality of agents to run appliances 240 according to their specific protocols. To do so, each agent may implement either a specific device driver or an SDK (software development kit) to execute the command to the appliance. For simple devices, this may be all that happens. However, if the appliance replies or triggers a response, appliance controller server 230 may relay the response via appliance controller server 230 back to appliance logic server 220 which, in turn, may update the state of the appliance, depending on the message, and may notify client manager 210 about the new state. Client manager 210 may update all relevant clients with the new status and information which, in turn, may notify the user and/or may change their displays accordingly.

In addition, system 200 may utilize a publish/subscribe system, such as MQTT, as an efficient communication layer between its various units.

It will be appreciated that system 200 may be designed such that data from each appliance 240 may be sent only once but may be distributed to all clients 202 which may be registered as controlling it. Thus, multiple clients 202 may receive data, alerts and notification from a single appliance. In addition, system 200 may funnel instructions from multiple clients 202 to a single appliance, changing its state in accordance with the received instructions.

System 200 may scale easily without affecting each appliance, which has limited resources for responding to users. Instead, client manager 210 may serialize all requests from multiple clients 202 to a single appliance.

System 200 may be a cloud based system, implementing each unit or multiple units on separate cloud-based servers.

Figure 5:
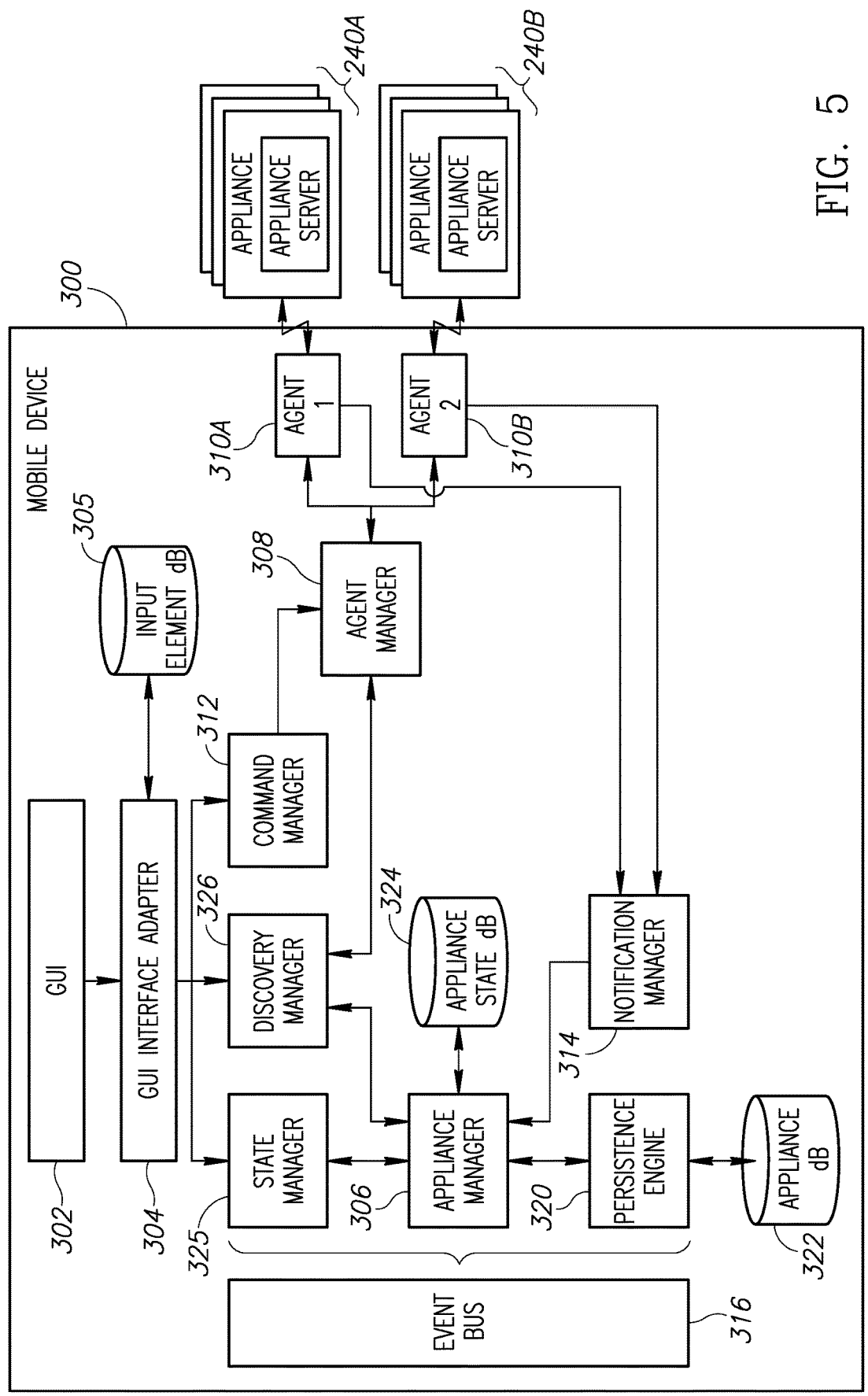
FIG. 5 is a block diagram illustration of an alternative universal remote controller, constructed and operative in accordance with a preferred embodiment of the present invention.

In an alternative embodiment, shown in FIG. 5 to which reference is now made, a universal remote controller 300 which separates the GUI from the appliance handling may be implemented generally entirely on a mobile device. Applicant has realized that, with mobile device-based control, the controlling device may not have any information about the activities of other devices also accessing the same appliance. Therefore, universal remote controller 300 may be 'stateless'.

As shown in FIG. 5, universal remote controller 300 may comprise a GUI 302, a GUI interface adapter 304, an appliance manager 306, an agent manager 308, a multiplicity of agents 310, one per protocol, a command manager 312 and a notification manager 314, all of whom may communicate via an event bus 316 using messages. Event bus 316 may be a publish/subscribe infrastructure on the mobile device, used to communicate asynchronously between the application modules.

GUI 302 may be the presentation layer of the application and may be similar to that described in U.S. patent application Ser. No. 14/870,353, filed Sep. 30, 2015, now issued as U.S. Pat. No. 9,842,491, issued Dec. 12, 2017, and assigned to the common assignee of the present application. GUI 302 may display the various input elements of an appliance currently being accessed according to pre-defined input panels, such as those of universal remote controllers of FIGS. 2 and 4, or of any similar universal controller. GUI 302 may be a predefined GUI or it may be dynamic, as described in more detail hereinbelow.

GUI interface adapter 304 may receive the messages delivered by the other elements of controller 300 and may determine what to display on GUI 302. For example, GUI interface adapter 304 may communicate with GUI 302 via well-defined APIs (application programming interfaces). It will be appreciated that separating GUI 302 from the other elements via GUI interface adapter 304 may enable changes to GUI 302 to be implemented without changing the operation of the other elements.

Agent manager 308 may manage multiple agents 310 and may be responsible for initialization, termination and monitoring of appliances 240. Each agent 310 may be in charge of communicating, via a specific communication protocol with a specific "class" of appliances. Thus agent 310A may communicate with appliances 240A via communication protocol A while agent 310B may communicate with appliances 240B via communication protocol B. Agents 310 may translate between the format of their specific protocol format and the internal format.

Each agent 310 may handle all aspects of communicate with the appliance, such as handshake, presence, and transmitting commands to appliances 240. In addition, agent 310 may request and receive status information from appliance 240 if its specific protocol allows such requests from its appliances 240. Each agent 310 may handle discovery of new appliances 240 using its specific protocol, as described in more detail hereinbelow.

It will be appreciated that agents 310 may be developed on top of a documented communication protocol, or on top of an SDK or software library encapsulating or implementing the communication.

Command manager 312 may receive the commands from GUI 302 and may forward them to the relevant agent(s) 310 for execution. Notification manager 314 may receive notifications on appliance state, as well as attribute updates, from agents 310 and may forward them to the relevant modules, such as appliance manager 306. In an alternative embodiment, command manager 312 and notification manager may also receive commands and notifications, respectively, from remote controllers connected through the internet or the "cloud".

Appliance manager 306 may be the primary source of information on the appliances in controller 300, and their states and statuses (regardless of the appliance type/system/protocol being used). Upon request of an agent 310, appliance manager 306 may expose the stored runtime state of an appliance. Appliance manager 306 may also update information about the appliances in controller 300.

Universal remote controller 300 may also comprise a persistence engine 320, an appliance database 322, an appliance state database 324 and a state manager 325. State manager 325 may keep track of the state of each currently active appliance, storing the information into appliance state database 324 and persistence engine 320. Appliance state database 324 may store the last known state and may be easily accessible to appliance manager 306 and state manager 325.

Persistence engine 320 may load and save information about the appliances which controller 300 may control in appliance database 322, to store information against a power outage. Such information may include basic appliance information, such as serial number, manufacturer, location in the user's home, last known state, update date, permissions, etc.

Figure 2:
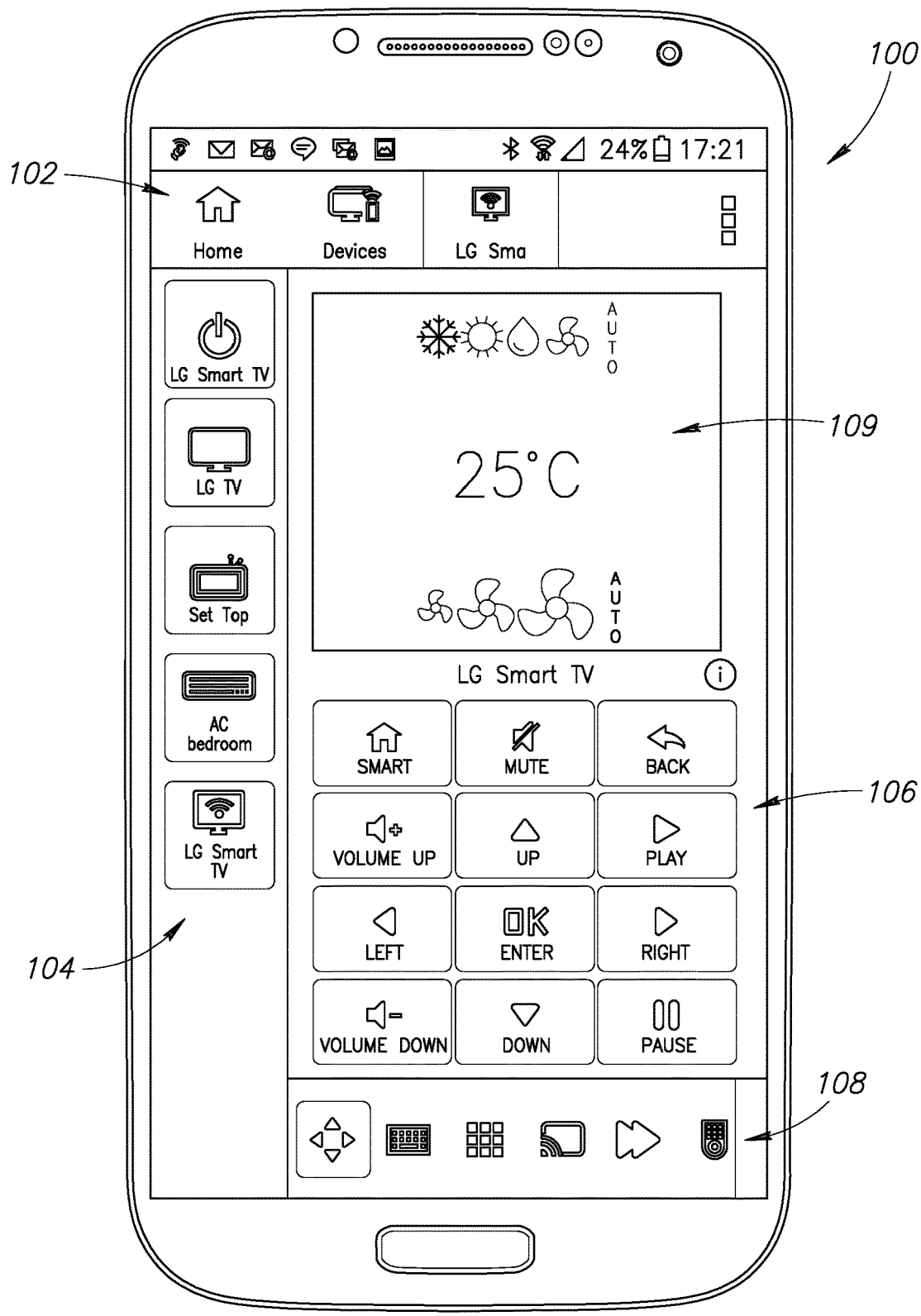
FIG. 2 is a schematic illustration of a prior art user interface of the remote controller of FIG. 1.
Figure 6A:
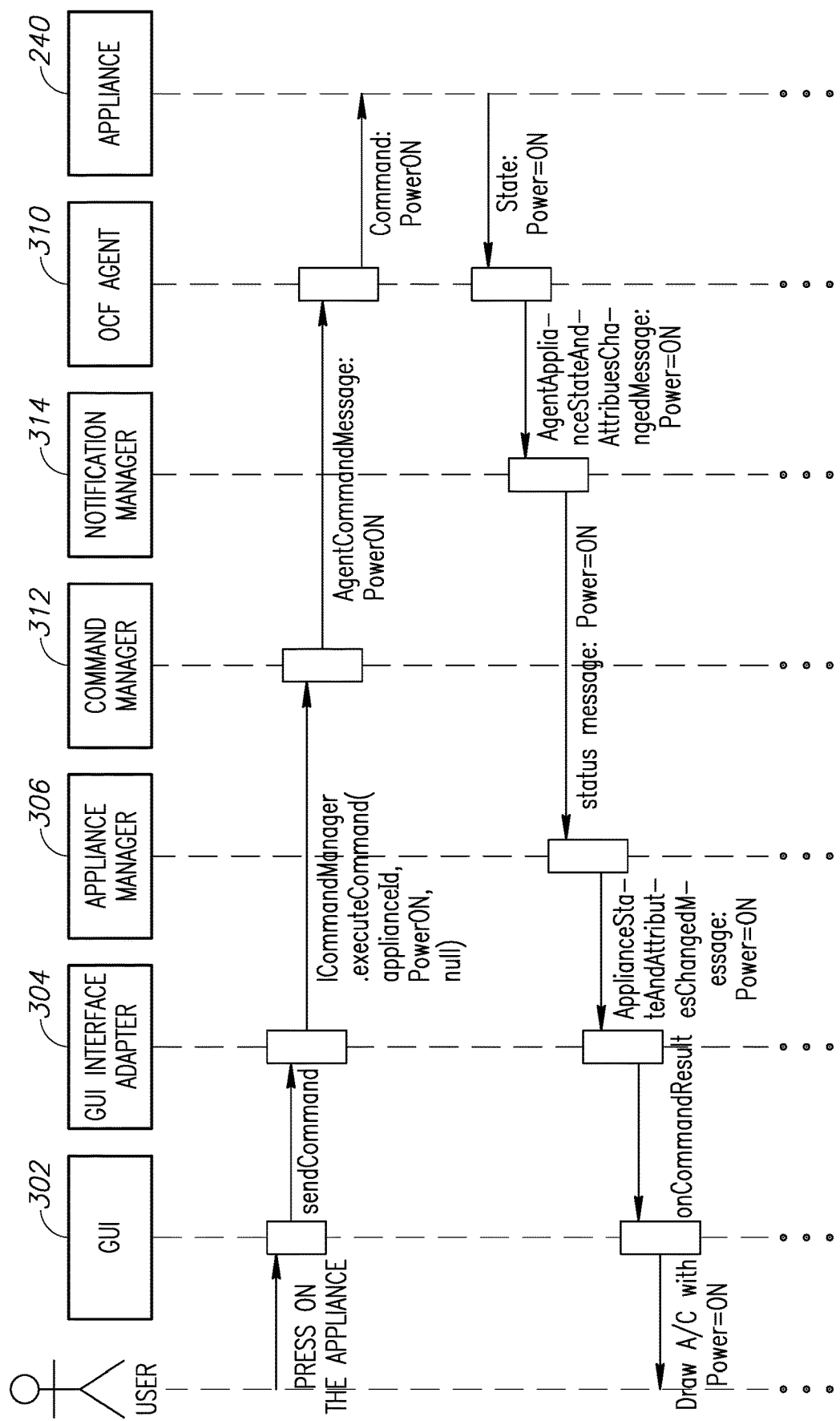
FIGS. 6A and 6B together form a timing diagram for the operation of the remote controller of FIG. 5.
Figure 6B:
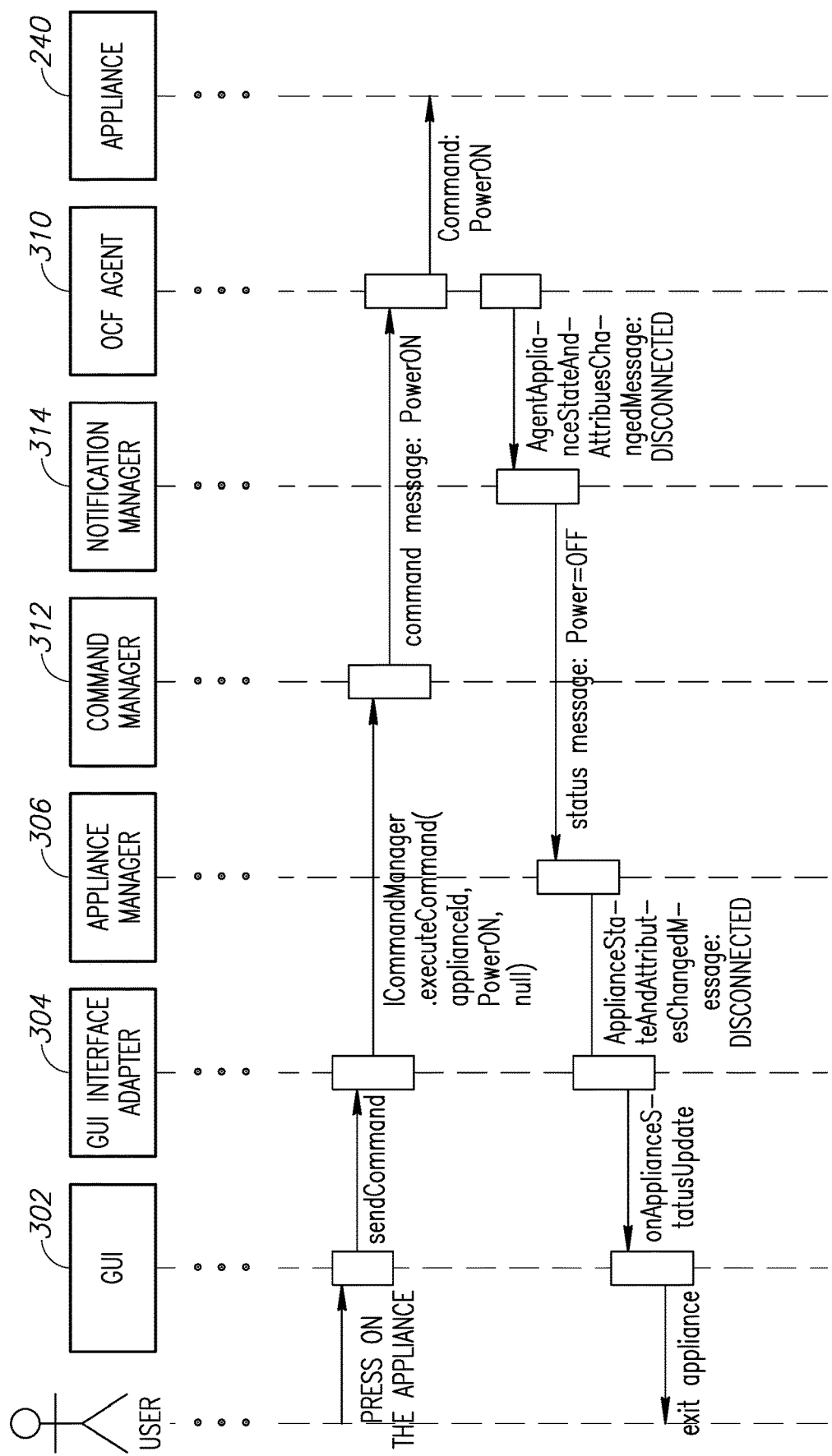

In operation and as shown in FIGS. 6A and 6B to which reference is now made, a user may use any of the input elements on the currently active input panel 106 (FIGS. 2 and 4) and GUI 302 may provide an indication of the user's command, along with the active appliance 240, to GUI interface adapter 304 who may, in turn, provide the command to command manager 312. Command manager 312 may provide the command to the relevant agent 310, such as an OCF agent as shown. Agent 310 may convert the command from the internal format of controller 300 to an appliance command and may transmit the appliance command to the protocol server on the indicated appliance 240. Appliance 240 will perform the commanded operation and, if relevant, will provide its resultant state, such as Power=ON, to its agent 310. Agent 310 will provide the resultant state to notification manager 314 who, in turn, will provide the state to appliance manager 306. Appliance manager 306 may then convert the state to an internal format and may forward the state to notification manager 314. Notification manager 314 may pass the message to appliance manager 306 who may store the result and may pass the message to GUI interface adapter 304 who may instruct GUI 302 to display the updated state on output panel 109 (FIGS. 2 and 4). All of these communications may be published as messages in the internal format on event bus 316 indicating the relevant unit (GUI 302, GUI interface adapter 304, appliance manager 306, command manager 312, notification manager 314 and OCF agent 310).

Should the appliance 240 be unable to respond within a defined period of time to the command from agent 310, agent 310 may provide a Power=OFF message to notification manager 314 who, in turn, will provide the state to appliance manager 306. Appliance manager 306 may then provide the state to GUI interface adapter 304 who will instruct GUI 302 to display the disconnected state on output panel 109 (FIGS. 2 and 4).

In accordance with a preferred embodiment of the present invention, each agent 310 may implement all the capabilities of its specific protocol, irrespective of which capabilities are implemented in a particular appliance with which it currently communicates. Many relatively new protocols, such as OCF, include an instruction for providing the attributes and/or capabilities of an appliance upon request as well as any identifying information. Each agent 310 which may implement a protocol with this instruction may include such an instruction and thus, may be able to learn the abilities of an appliance 240 from the appliance itself, rather than having them predefined in and/or downloaded to appliance database 322. Applicant has realized that this may enable new appliances in the vicinity of universal remote controller 300 to be "discovered" rather than activated by the user as in the prior art. Accordingly, controller 300 may additionally comprise a discovery manager 326 which may handle the flow of the discovery process. Discovery manager 326 may locate and add new appliances 240 to controller 300 based on the information provided to agents 310 during the discovery process. The information may be the type of the appliance, its serial number, and its input elements and their ranges.

Figure 7A:
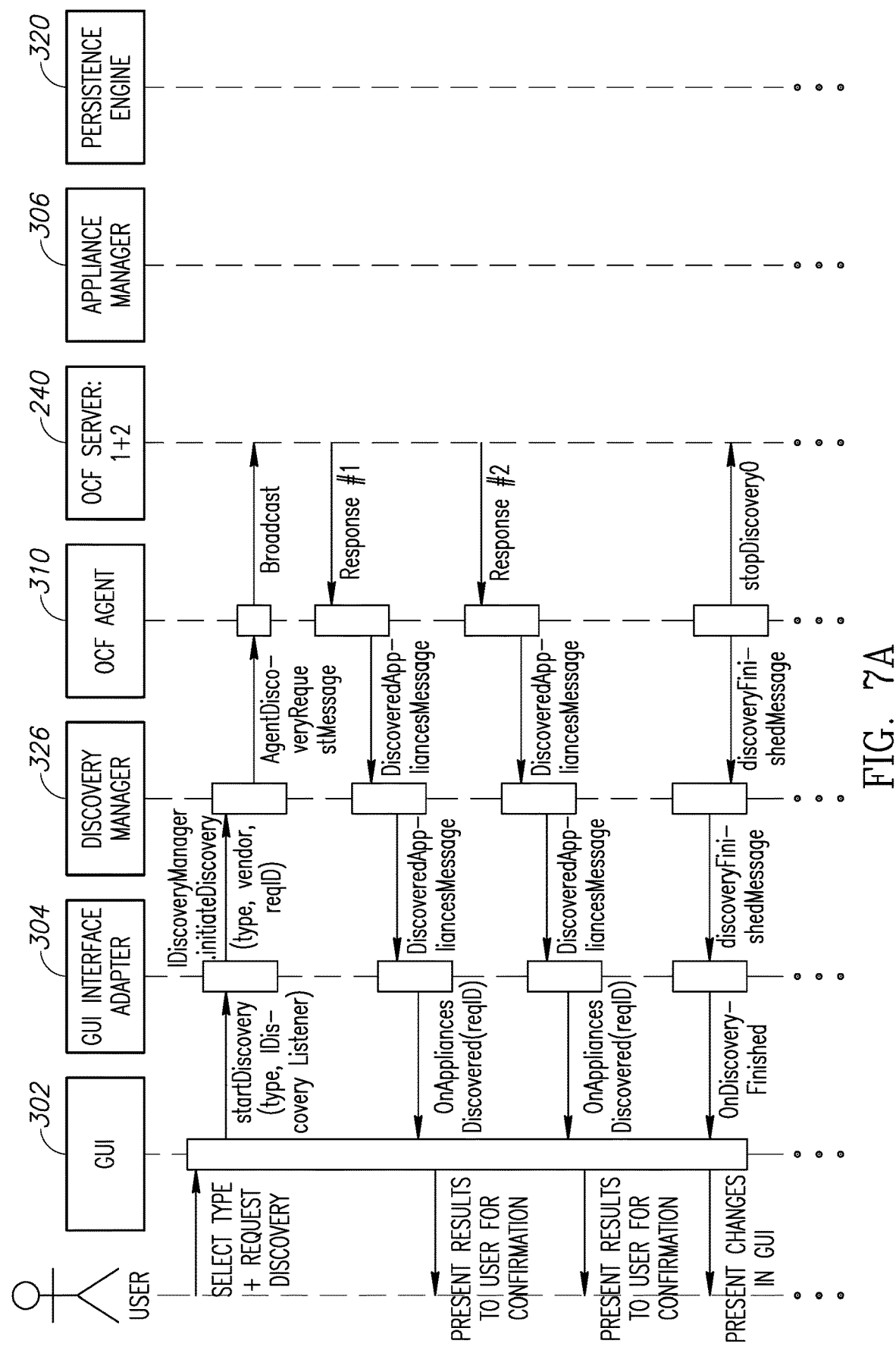
FIGS. 7A and 7B together form a timing diagram for a discovery process of the remote controller of FIG. 5.
Figure 7B:
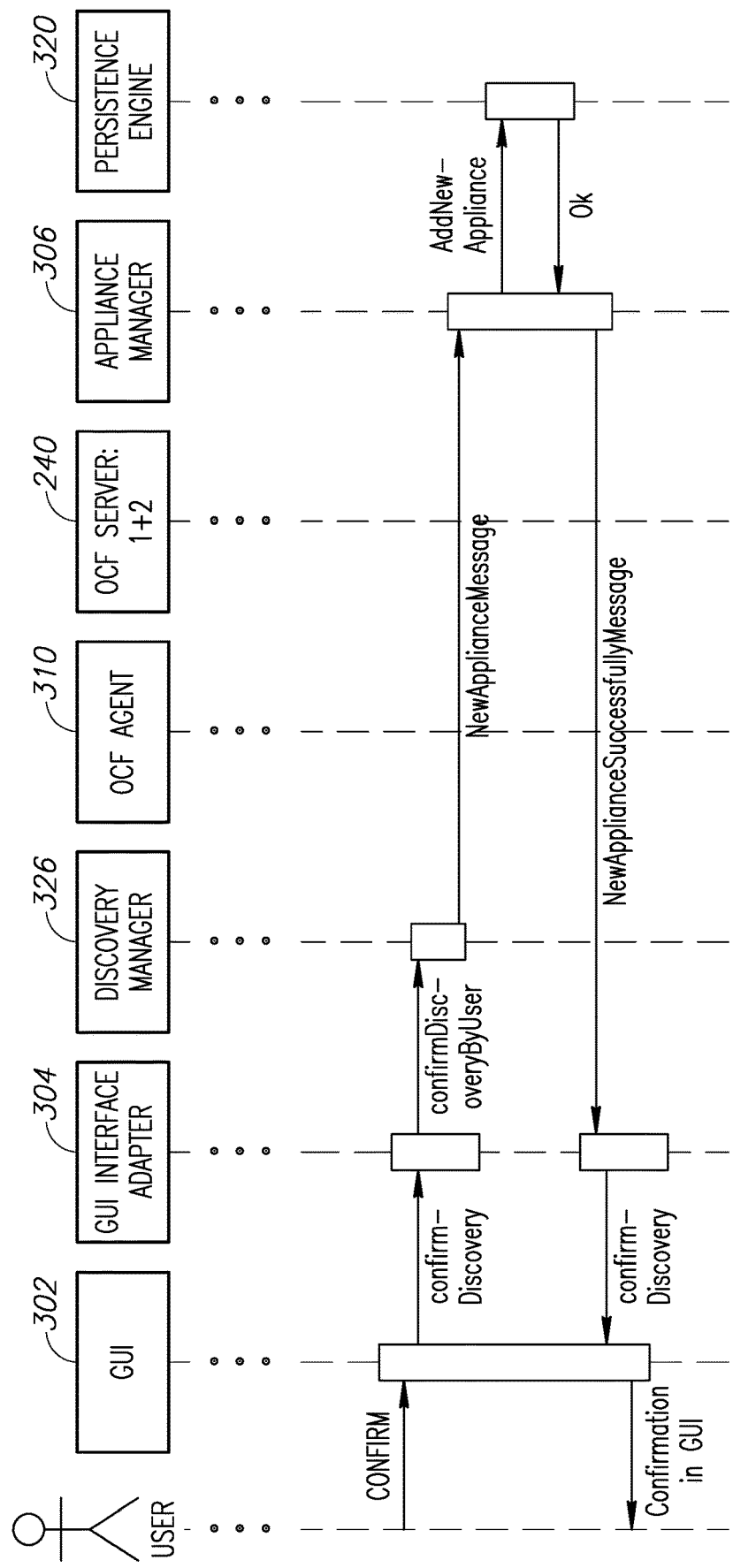

Discovery manager 326 may instruct agents 310 to discover all of the appliances in their vicinity. Each agent 310 may expose the interfaces of the appliances 240 they discover during the discovery process. The discovery process, which is implemented with messages between units, is shown in FIGS. 7A and 7B, to which reference is now made. The user requests discovery via GUI 302. GUI 302 may provide the request to GUI interface adapter 304 which may pass the request to discovery manager 326. If the request is for a particular type of appliance, discovery manager 326 may pass the request to the agent 310 for the particular standard. Otherwise, discovery manager 326 may activate all agents 310 that are capable of performing discovery.

Agent(s) 310 may broadcast their requests for discovery on the appropriate medium for their type of appliance, for example, a UDP multicast packet. This request may be active only for a predefined period of time. During this period, the server on each appliance which may receive the request may respond with its ID packet, which may include its address and basic identification information, such as name, manufacturer and type, and may transmit their responses to the transmitting agent(s) 310. The relevant agent 310 may translate the information to the internal format for IDs. In addition, the relevant agent 310 may then log onto the appliance, using the rules for logging in for the particular protocol. Once logged on, the relevant agent may fetch the user interface information of the appliance, which may include the input devices of the appliance and their ranges, if relevant. FIG. 7A shows 2 responses received during the predefined period of time.

Agent(s) 310 may fetch the GUI information from an appliance resource database associated with the appliance. This resource database is a function of the particular protocol. For example, the agent for the OCF protocol may traverse the resources of the appliance (as exposed by the appliance) to pull out the resource information. For the IGRS protocol, all appliance information may be stored in a single, country-wide database, called SADL. The IGRS agent may provide the SADL server with the ID of the appliance and may receive the SADL file of the appliance. Each agent 310 may then translate the received information, an appliance attribute list, into the internal format of controller 300.

The appliance attribute list may list each property as a name and a value, where the values may be interpreted as numeric, date, time or Boolean data types, depending on the capabilities of the specific appliance.

An exemplary attribute list for an air conditioner might be:

Input Elements:
1. Power (Boolean)
2. Mode (string: "cool", "heat", "fan")
3. CurrentTemperature (int)
4. TargetTemperature (int)

Supported Commands:
1. SetPower (Boolean)
2. SetMode (string)
3. SetTargetTemperature (int)

The agent(s) 310 may pass the attribute list, with its input elements and supported commands, to discovery manager 326 who, in turn, may pass information about the appliance to GUI interface adapter 304 to present the information on GUI 302 for the user to confirm the presence of the appliance in his vicinity.

After the period has ended, GUI 302 may provide the confirmation to GUI interface adapter 304 to pass it to discovery manager 326 to pass to appliance manager 306. Appliance manager 306 may then add the new appliance and store its appliance information as well as its attribute list, in persistence engine 320, to keep its information active. Once the appliances have been added, appliance manager 306 may instruct GUI interface adapter 304 to change GUI 302 to include the new appliances and to generate input panels 106 appropriate to the received list of attributes for each new appliance.

It will be appreciated that, with appliance discovery, GUI 302 may have a dynamic layout. GUI interface adapter 304 may generate input panels for each new appliance based on the specific control elements of the new appliance from a set of predefined control elements, stored in an input element database 305 (FIG. 5). Each type of attribute may have a different type of input display element associated therewith. For example, a boolean attribute may have an input button associated therewith, a string attribute may have a text box associated therewith, a numeric attribute may have a slider associated therewith, whose endpoints may be the start and end of the associated range, and a multi-string attribute, such as "mode" in the example above, may have a drop down box associated therewith.

GUI interface adapter 304 may indicate the appropriate input display elements to GUI 302, to place in input panel section 106. If there are more input elements than there is room in section 106, GUI interface adapter 304 may organize the input display elements according to functionality and ease of use. This may be implemented via a set of organizing keywords, also stored in input element database 305, where attributes having certain keywords may be organized onto the same input panels.

In accordance with a preferred embodiment of the present invention, agents 310 may also discover certain commands or attributes for a new appliance of a known protocol, even if the capability is not specified in its known protocol. This is a "Dynamic" extension to the known protocol and is possible due to the discovery process. In addition, there may be a fully dynamic type of appliance whose protocol is a known protocol but the capabilities are unknown.

Figure 8A:
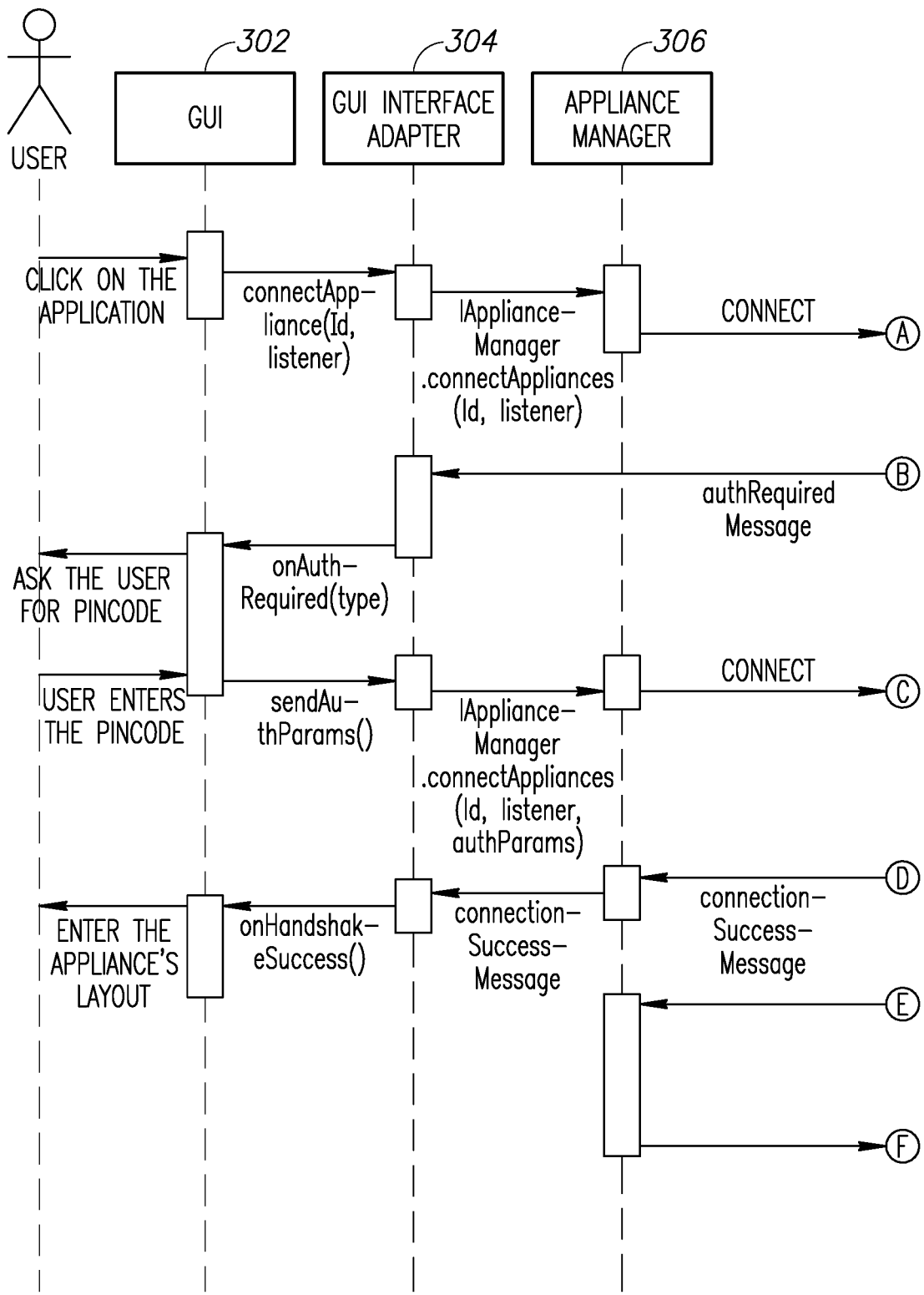
FIGS. 8A and 8B together form a timing diagram for a process of connecting to a known appliance.
Figure 8B:
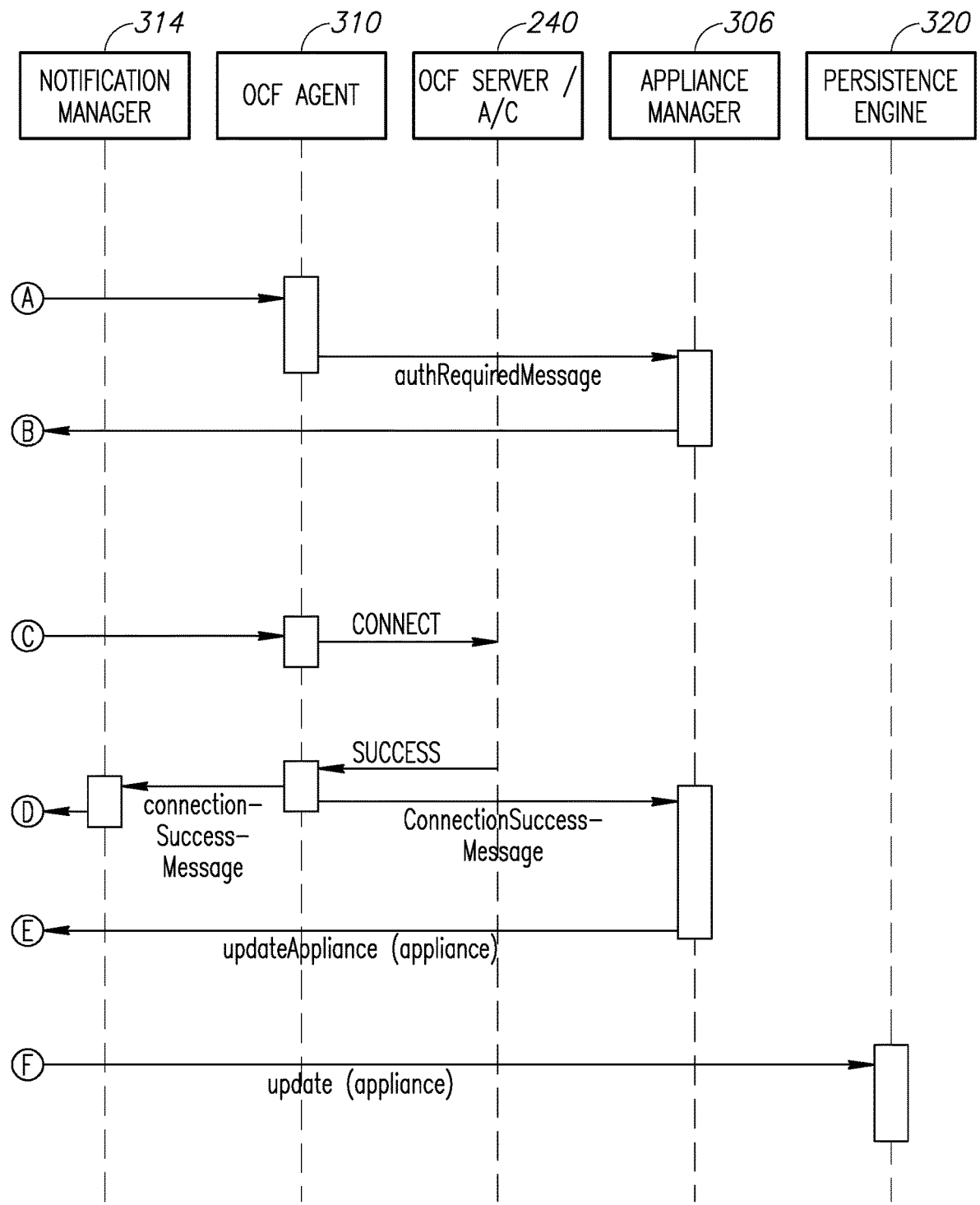

Reference is now made to FIGS. 8A and 8B, which together illustrate the process of connecting to a known appliance. The user may click on an appliance on GUI 302. GUI interface adapter 304 may provide the command to appliance manager 306 who may, in turn, send a connect message to the appropriate agent 310. Agent 310 may send a connection request to the server on the selected appliance 240. The appliance 240 may start its authentication process and may send an authentication request back, through the various elements, to GUI interface adapter 304.

GUI interface adapter 304 may display the authentication request on GUI 302 in response to which, the user may type in his PIN (personal identification number), which is passed to appliance 240 (via GUI interface adapter 304, appliance manager 306 and agent 310). The appliance 240 may utilize the PIN to authenticate the user. Once authenticated, appliance 240 may send a 'success' message to agent 310. Agent 310 may ask for appliance information so it may update the appliance in both appliance manager 306 and in persistence engine 320.

It will be appreciated that some appliances are "bridged", that is, they are connected to another appliance. Controller 300 may register bridged appliances as regular appliances of their type and protocol, while listing the special communication needs of the bridged appliance. There may be multiple bridged appliances connected via the same bridge.

A "bridge" definition per appliance may be embedded within an ApplianceAgentConfiguration object being persisted for the appliance in persistence engine 320. The information will stay outside the agent boundaries.

To handle a bridged appliance, the agent 310 may communicate with the bridge and may update the status of the bridged appliances upon a connectivity change for their related bridge. If required by the protocol, the relevant agent 310 may establish communication with the available bridges during a discovery request, so that the bridges may report information on any of their bridged appliances.

It will be appreciated that the present invention may provide a consistent experience to the user, even if the user may have appliances from multiple systems and vendors. The present invention may also enable many users to control, monitor and get notifications from same appliance. The present invention may control appliances regardless of their origin, if they have a documented interface (SDK or API). Importantly, the present invention may discover appliances in the vicinity of the user, thereby enabling the user, who may not know or cannot easily find the serial number of his/her appliance, nor may s/he know how to install an appliance, to add new appliances with very little work.

Appliance Manager 306

Appliance manager 306 may contain the list of all the appliances in controller 300 and their most up-to-date state and attribute information and may generate notifications on the changes of the state and attributes of appliances. Appliance manager 306 may enable requests to connect and disconnect an appliance and may interface to add/delete/update an appliance. In particular, GUI 302 may use appliance manager 306, in order to add appliances manually (example: IR). Appliance manager 306 may also query the current network connectivity status.

Agent Manager 308

Agent Manager 308 may be responsible for the life cycle of the agents. It is the only entity allowed to instantiate, terminate and manage agents. All other modules may communicate with the agents exclusively via agent manager 308. In addition, agent manager 308 may receive all the messages intended for the agents, and may forward them to the destination agent. This is in order to ensure that the messages are never sent to a non-existing agent instance.

Agent manager 308 may start, stop or restart any agent, by its own logic, upon explicit request, such as when appliance manager 306 may pass a list of agents 310 to start, or by an implicit request (a certain command intended for an agent that is currently down).

To do so, appliance manager 306 may, upon initialization, ask agent manager 308 to initialize all agents related to the persisted appliances, as listed in persistence engine 320.

Agent manager 308 may receive a notification to perform discovery on an agent being down, may listen to the agent status notifications coming from the agent, and may update its internal list.

Notification Manager 314

Notification manager 314 may receive the notification messages about the state and the attribute values changed for the registered appliances, may update, via an API, the state and attribute lists maintained in appliance manager 306, and may issue a notification to all interested modules. The notifications may originate from local agent 310 or may arrive from the internet as well.

Command Manager 312

Command manager 312 may expose the API for GUI 302 to send commands to the appliances. In alternative embodiments, command manager 312 may support commands issued by other modules, or originating from the internet. Command manager 312 may also support test commands, which may be commands sent to the appliances not defined yet in controller 300, in order to check their response. Example: users have to send test commands to check which IR "remote" works with their appliance.

Discovery Manager 326

As mentioned hereinabove, discovery manager 326 may handle the appliance discovery flow, both automatic and manual (i.e. those that cannot be discovered automatically and may store the data related to the active discovery requests and the arriving responses. The automatic logic is as follows:

GUI 302 may initiate a request, per a certain type of appliance. Each request gets a unique ID. In some cases, the discovery request may carry authentication information. Such a request means "find appliances in context of the authentication data" (example: cloud account credentials). Discovery manager 326 may determine the list of all the relevant agents, based on the request (type and vendor) and the agents' product configuration. Discovery manager 326 may send the discovery message ("stamped" by the request ID) to all the relevant agents.

Each agent 310 may perform the discovery and may report back the information (possibly in chunks). Discovery manager 326 may forward it back to the GUI, after basic filtering of at least the following based on the 'appliance-AgentID' provided by the agent:

1. Make sure no appliance existing in the system is reported, even if "discovered" by an agent.

2. Make sure no duplicate appliance is reported, even if duplicate appliances were reported in responses to a single discovery request, for any reason.

When discovery manager 326 may determine that the process is over (as described hereinbelow), it may send an "End of discovery" message. In the GUI, the user makes a decision to add certain appliances to the system, with an option to specify their names. The GUI will be updated, after which the appliance will get added in the appliance manager 306.

The discovery manager 326 may keep track (per request) of relevant responses from agents 310. An agent 310 may report End_discovery when it detects it. If all the agents 310 involved have reported End_discovery, then discovery manager 326 may end the discovery process and may issue a discovery_end notification. However, if not all agents 310 report End_discovery by the end of the discovery period, discovery manager 326 may end the discovery process and may ignore any responses coming from the agents with respect to the ended request.

If GUI 302 provides a discovery_cancel request, discovery manager 326 may also stop processing incoming notifications and may stop issuing outgoing notifications.

Discovery manager 326 may also capture the "network connectivity" information (including the name of the connected WiFi network) and may provide it to persistent engine 320 for storage.

Persistence Engine 320

Persistence engine 320 may persist the information of the static ("admin") information on the appliances. This information must be sufficient in order to recover the normal application functionality after a power down or other functionality stoppage. Persistence engine 320 may also support the persistence of the configuration of agents 310. In an alternative embodiment, it may be extended to support domains and additional administrative functionality around appliance management.

An exemplary implementation of persistent engine 320 may utilize the "Shared Preferences" mechanism of Android devices. Only appliance manager 306 may interact with persistence engine 320.

GUI Interface Adapter 304

The primary functions of GUI interface adapter 304 are:

1. Provide an isolated API for the GUI, matching its needs. This may provide flexibility of adjusting the API to the needs of GUI 304, without changing any of the other components.

2. Solve threading issues by moving requests and operations into new threads, thus freeing the GUI thread.

3. Provide an asynchronous API via callbacks. The API will call the callback upon getting a response (typically via a message) matching the request. For example, upon requesting a discovery, the results (i.e. appliances found) will be reported via a callback.

4. Generate new input panels for newly discovered appliances 240.

Infrastructure

The infrastructure is built with several modules (each module has its own functionality and role) that communicate with each other either by function calls or a messaging mechanism based on publish/subscribe mechanism. The infrastructure modules are wrapped with GUI adapter making them all together one black box from the GUI's point of view.

Event Bus 316

Event Bus 316 may be implemented with "EventBus", an open source program available from Green Robot at http://greenbot.org/eventbus/. It is optimized and fast and provides control over multithreading. EventBus usage is based on Annotations, handlers and messages.

Each message may be received by each component on a new thread. GUI interface adapter 304 may decouple user interface threads from further function calls and logic and may call the callback on the GUI thread.

API calls and message handlers are on different threads to keep modules thread-safe.

The current initialization process will initialize all the relevant core modules and the agents 310. The GUI will stay blocked till the initialization is finished.

Agents 310

Agents may be implemented as classes, complying with certain interfaces, such as API calls and messaging. Each agent is represented by its main class which may be instantiated, using the init( ) method of Android, by agent manager 308. Instantiation of each agent 310 may be called on a fresh thread and the agent configuration may be passed to the agent 310 as a parameter during the instantiation. The agent 310 may report an INITIALIZING status immediately and a READY status after finishing the initialization. As part of the initialization process, each agent 310 may register itself to listen to the incoming messages, before reporting "READY".

Upon termination of the application, or by any other logic, agent manager 308 may call the destroy( ) method of Android on the agent's main class. On such a call, each agent 310 may terminate all its connections and may close all its resources, to the best effort allowed by the protocol or SDK. Upon finishing the cleanup, each agent 310 may issue a TERMINATED status.

Agents 310 may query appliance manager 306 for information on the appliances including any persistent information related to them and on the network connectivity status. All the other communication between the core modules and agents 310 may be via the messaging mechanism.

Each agent 310 may establish communication with the appliances upon a Connect request and may free all resources (including stopping an observation) upon a Disconnect request.

Each agent 310 may obey an appliance observation request and may send updates upon attribute changes of the observed appliances with a reasonable frequency. Polling may be required when the protocol/SDK does not provide a better mechanism for the observation. Agents 310 may be expected to proactively monitor the connectivity with the connected appliance, and to report state updates. If possible, agents 310 may perform automatic re-connection with an appliance having temporary communication issues.

Agents 310 may monitor their communication with their appliances 240 via a service, such as a cloud service as opposed to one communicating with appliances and bridges. These agents may monitor the connectivity with the service, report DISCONNECTED upon loss of connectivity, and perform best efforts to re-establish connectivity, and report READY upon success.

It will be appreciated that controller 300 may provide a universal remote controller from a mobile device. Applicant has realized that controller 300 may utilize the location information many mobile devices have to support interaction with appliances split over multiple physical locations, such as home and office. This information may be stored by appliance manager 306. Controller 300 may also support locations of different types, such as home and office, as defined by the user. The home location may be controlled by a single owner, with access rights shared between family members while the office location may be managed by a sysadmin, with rights to specific users delegated according to their job and office location.

In accordance with a preferred embodiment of the present invention, controller 300 may receive location information, such as from a GPS device on the mobile device, may determine which location the user is currently at, and may indicate which devices are available at the location.

A user may group appliances 240 into groups or domains, such as a living room, which may include a TV, lights and an air conditioner, and a bed room, which may include lights, an air conditioner and shades. Groups may have a one-click control command to all the appliances in the group and/or a rule may be applied to the whole group. This information may be maintained by appliance manager 306.

The user may manage each group's structure, may assign devices to each group and may define group-level access control. GUI 302 may reflect the structure of the groups and appliances to the user.

If an appliance is moved to a different group, all the settings per appliance are kept but the old group settings are forgotten. The new group settings apply immediately.

With grouping, appliance manager 306 may also implement scenes or scenarios, which are a combination of appliances 240 and their respective state. The user may define and manage scenes, including providing them with a name and icon. The user may define the scene in many ways, such as from predefined scene templates, where the user just needs to fill in group, devices, and state values, by capturing the current state or by choosing the scene manually.

Each scene may be listed on GUI 302 and may be implemented with a single click to activate all of the appliances in the scene to the desired state.

In addition, appliance manager 306 may implement scripts, rules and alerts defined by the user. For example, an automation rule may be defined by a condition which triggers an action.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A universal remote controller implemented on a mobile device, the remote controller comprising:
   a processor of said mobile device; and
   a single mobile application, implemented on said processor, remotely controlling appliances from multiple vendors, said appliances having multiple protocols of communication, the mobile application comprising:
      a multiplicity of agents to command said appliances, each said agent to convert between one of said appliance protocols from among said multiple protocols of communication and an internal communication format of said controller, and each agent to communicate with its associated set of appliances via said one appliance protocol, wherein said multiple protocols comprise at least one proprietary appliance protocol of one of said multiple vendors;
      an agent manager to maintain and update a list of said agents and to control the activity of said multiplicity of agents;
      an interface adapter to receive a user command to said selected appliance issued from and input panel and to generate at least one associated internal command in response to said user commands; and
      an appliance manager to store information about each appliance to be controlled by said remote controller, said information comprising at least a state machine for each said appliance, wherein each said state machine comprises a list of states of said appliance, transitions between states and at least one triggering condition for at least one transition, to maintain and update a current state for each currently active appliance whenever a triggering condition for said appliance occurs and to notify said interface adapter about said updated current state,
      said managers, agents and adapter to communicate via messages.

2. The controller according to claim 1 and wherein said mobile application also comprises a discovery manager to activate at least one agent to discover appliances within a vicinity of said mobile device and to provide said discovered appliances to said appliance manager to be added to the list of appliances being controlled by said controller.

3. The controller according to claim 2, said discovery manager also to determine the attributes of said discovered appliances and to provide an attribute list to said interface adapter, said adapter comprising an input element database associating attribute types with input display element types, said adapter to generate new input panels for said discovered appliances from said input display element types in said input element database.

4. The controller according to claim 2, each said agent to broadcast a request for discovery according to its associated appliance protocol of communication and to receive responses from any appliance having its associated appliance protocol of communication and being connected on a network associated with said mobile device.

5. The controller according to claim 3, each said agent to fetch said attribute list of said appliance from an appliance resource database associated with said appliance.

6. A method for a universal remote controller implemented on a mobile device, the method comprising:
   providing a single mobile application to remotely control appliances from multiple vendors, said appliances having multiple protocols of communication, said providing comprising:
      communicating with said appliances with a multiplicity of agents, each agent converting between one of said appliance protocols from among said multiple protocols of communication and an internal communication format of said controller, and each agent communicating with its associated set of appliances via said one appliance protocol, wherein wherein said multiple protocols comprise at least one proprietary appliance protocol of one of said multiple vendors;
      receiving a user command to a selected appliance issued from an input panel and generating at least one associated internal command in response to said user commands;
      maintaining and updating a list of said agents and controlling the activity of said multiplicity of agents, including providing said internal command to one of said agents;
      storing information about each appliance to be controlled by said remote controller, said information comprising at least a state machine for each said appliance, wherein each said state machine comprises a list of states of said appliance, transitions between states and at least one triggering condition for at least one transition; and maintaining and updating a current state for each currently active appliance whenever a triggering condition for said appliance occurs and notifying said interface adapter about said updated current state.

7. The method according to claim 6 and also comprising activating at least one agent to discover appliances within a vicinity of said mobile device and adding said discovered appliances to the list of appliances being controlled by said controller.

8. The method according to claim 7 and also comprising determining the attributes of said discovered appliances and generating new input panels for said discovered appliances from said input display element types in an input element database associating attribute types with input display element types.

9. The method according to claim 7, and also comprising each agent broadcasting a request for discovery according to its associated appliance protocol of communication and receiving responses from any appliance having its associated appliance protocol of communication and being connected on a network associated with said mobile device.

10. The method according to claim 8 and also comprising fetching said attribute list of said appliance from an appliance resource database associated with said appliance.

* * * * *

UNITED STATES PATENT AND TRADEMARK OFFICE
CERTIFICATE OF CORRECTION

PATENT NO. : 10,719,200 B2  
APPLICATION NO. : 15/436816  
DATED : July 21, 2020  
INVENTOR(S) : Ofer Rotschield et al.

Page 1 of 1

It is certified that error appears in the above-identified patent and that said Letters Patent is hereby corrected as shown below:

In the Claims

Claim 1:
Column 17, Line 65: Delete "and" and insert --an--.

Claim 6:
Column 18, Line 49: The extra word "wherein" is removed.

Signed and Sealed this
Eighteenth Day of August, 2020

Andrei Iancu
*Director of the United States Patent and Trademark Office*